US008408771B2

(12) United States Patent
Mikami et al.

(10) Patent No.: US 8,408,771 B2
(45) Date of Patent: Apr. 2, 2013

(54) LAMP UNIT

(75) Inventors: Youji Mikami, Toyota (JP); Daisuke Nagafuchi, Kawasaki (JP); Koji Sato, Souka (JP)

(73) Assignee: Toyota Shatai Kabushiki Kaisha, Aichi-ken (JP)

(*) Notice: Subject to any disclaimer, the term of this patent is extended or adjusted under 35 U.S.C. 154(b) by 149 days.

(21) Appl. No.: 12/993,771

(22) PCT Filed: Feb. 18, 2009

(86) PCT No.: PCT/JP2009/052786

§ 371 (c)(1), (2), (4) Date: Feb. 15, 2011

(87) PCT Pub. No.: WO2009/142035

PCT Pub. Date: Nov. 26, 2009

(65) Prior Publication Data

US 2011/0157909 A1 Jun. 30, 2011

(30) Foreign Application Priority Data

May 23, 2008 (JP) ................................ 2008-135153

(51) Int. Cl.
*B60Q 1/00* (2006.01)

(52) U.S. Cl. ........................................ 362/547; 362/516

(58) Field of Classification Search .................. 362/547, 362/516
See application file for complete search history.

(56) References Cited

FOREIGN PATENT DOCUMENTS

| | | | |
|---|---|---|---|
| DE | 199 33 766 | A1 | 5/2001 |
| DE | 10 2007 059 009 | A1 | 1/2009 |
| GB | 2 314 406 | A | 12/1997 |
| JP | 2004-119198 | | 4/2004 |
| JP | 2007-012368 | | 1/2007 |
| JP | 2008-071512 | | 3/2008 |
| JP | 2008-098089 | | 4/2008 |

OTHER PUBLICATIONS

English Translation of JP2008-071512, published Mar. 27, 2008.*

* cited by examiner

*Primary Examiner* — Mary Ellen Bowman
(74) *Attorney, Agent, or Firm* — Douglas J. Christensen

(57) ABSTRACT

A lamp unit is constructed of light sources, a reflector, a lamp housing that receives the light sources and the reflector therein, and a lamp lens that closes an opening of the lamp housing. The reflector has a through hole that is formed in a portion positioned above a first light source as a heat source, so that air warmed by heat of the first light source can be introduced into a rear side of the reflector via the through hole. The air introduced into the rear side of the reflector via the through hole and ascending therein can be lead by a first guide means to an air stagnating portion positioned in an end periphery of a hermetically-closed space that is defined by the lamp housing and the lamp lens.

4 Claims, 6 Drawing Sheets

LAMP UNIT

PRIORITY CLAIM

The present application is a National Phase entry of PCT Application No. PCT/JP2009/052786, filed Feb. 18, 2009, which claims priority from Japanese Patent Application Number 2008-135153, filed May 23, 2008, the disclosures of which are hereby incorporated by reference herein in their entirety.

TECHNICAL FIELD

The present invention relates to a lamp unit constructed of a light source, a reflector plate that surrounds the light source from behind and reflects light emitted from the light source forwardly, a lamp housing that receives the light source and the reflector therein, and a lamp lens that closes an opening of the lamp housing.

BACKGROUND ART

A related lamp unit is described in Japanese Laid-Open Patent Application No. 2007-12368.

As shown in FIG. 9, the lamp unit 100 is constructed of a light source 102, a reflector 103 that surrounds the light source 102 from behind and reflects light emitted from the light source forwardly, a lamp housing 104 that receives the light source 102 and the reflector 103 therein, and a lamp lens 105 that closes an opening of the lamp housing 104. Further, the reflector 103 has a rib 107 that is formed in a rear side thereof. The rib 107 is capable of guiding ascending airflow produced in the lamp unit 100 by heat generation of the light source 102 and thermally convecting air. This can reduce possibility of generation of fog in the lamp unit 100.

DISCLOSURE OF THE INVENTION

Problem to be Solved by the Invention

However, in the lamp unit 100 described above, the air present in the rear side of the reflector 103 can be warmed by heat of the light source 102, so as to generate the ascending airflow in the rear side of the reflector 103. Therefore, it is necessary that the light source 102 has a large amount of heat generation. As a result, the structure described above cannot substantially be applied to lamps each having a small amount of heat generation, e.g., a turn-signal lamp or other such lamps.

Therefore, there is a need in the art to inhibit generation of fog in the lamp unit by effectively using the heat of the light source even if the light source has a small amount of heat generation.

SUMMARY OF THE INVENTION

In one aspect of the present invention, a lamp unit is constructed of light sources, a reflector that is capable of surrounding the light source and reflecting light emitted from the light source forwardly, a lamp housing that receives the light sources and the reflector therein, and a lamp lens that closes an opening of the lamp housing. The reflector has a through hole that is formed in a portion positioned above a first light source as a heat source, so that air warmed by heat of the first light source can be introduced into a rear side of the reflector via the through hole. The air introduced into the rear side of the reflector via the through hole and ascending therein can be lead by a first guide means to an air stagnating portion positioned in an end periphery of a hermetically-closed space that is defined by the lamp housing and the lamp lens.

According to the aspect, the air warmed by the heat of the first light source and accumulated in front of the reflector is introduced into the rear side of the reflector through the through hole. Thus, even if the first light source has a small amount of heat generation, warmed air can be introduced into the rear side of the reflector.

Further, the warmed air introduced into the rear side of the reflector is guided by the first guide means when it ascends, so as to be lead to the air stagnating portion positioned in the end periphery of the hermetically-closed space that is defined by the lamp housing and the lamp lens. As a result, flow of air can be generated in the air stagnating portion in which the air is the hardest to flow, so as to reduce possibility of generation of fog in the air stagnating portion.

That is, even if the light source has a small amount of heat generation, it is possible to effectively use the heat of the light source, so as to inhibit generation of fog in the air stagnating portion formed in the lamp unit.

In a another aspect of the present invention, a support member supporting another light source is disposed in the rear side of the reflector so as to be positioned above the through hole, so that the air ascending in the hermetically-closed space can be separated into right and left by the support member and a second guide means formed in the support member.

Thus, convection of air can be generated in each of a right side and a left side of an interior of the lamp unit. Therefore, the air can be efficiently fed to the end periphery of the hermetically-closed space.

In a further aspect of the present invention, the air that is cooled down while the air is lead to the air stagnating portion positioned in the end periphery of the hermetically-closed space and descends along the end periphery of the hermetically-closed space can be lead to the first light source by a third guide means.

Thus, the convection of air can be easily generated between the first light source and the air stagnating portion by the third guide means.

According to the present invention, it is possible to inhibit generation of fog in the air stagnating portion in the lamp unit even if the light source has a small amount of heat generation because the heat of the light source can be effectively used.

DETAILED DESCRIPTION OF THE INVENTION

Figure 1:
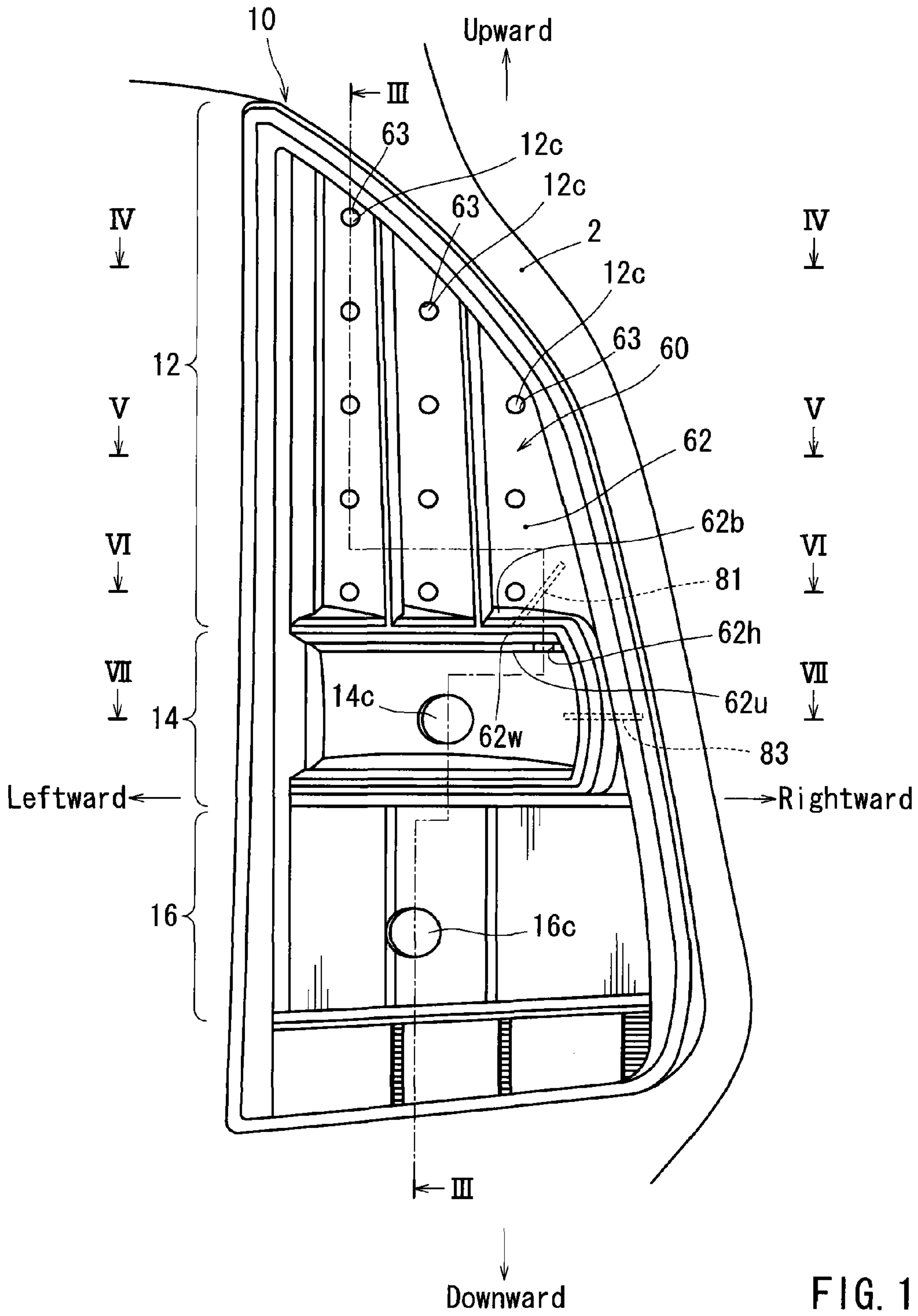
FIG. 1 is a patterned elevational view of a lamp unit (a rear combination lamp) according to Embodiment 1 of the present invention.

Best Mode for Carrying Out the Invention

Embodiment 1

In the following, a lamp unit according to Embodiment 1 of the present invention will be described with reference to FIG. 1 to FIG. 8.

Further, in the drawings, forward and rearward, rightward and leftward, and upward and downward respectively correspond to forward and rearward, rightward and leftward, and upward and downward of a passenger vehicle.

<Regarding Outline of Rear Combination Lamps 10>

Each of rear combination lamps 10 is a lamp unit in which a brake lamp (double as a tail lamp), a blinker lamp and a reverse lamp are integrated with each other. The right and left rear combination lamps 10 are used in pairs. Further, the right and left rear combination lamps 10 (which will be hereinafter referred to as lamp units 10) have shapes symmetrical to each other and have structures identical with each other. Therefore, the right lamp unit 10 will be described as a representative thereof.

Figure 2:
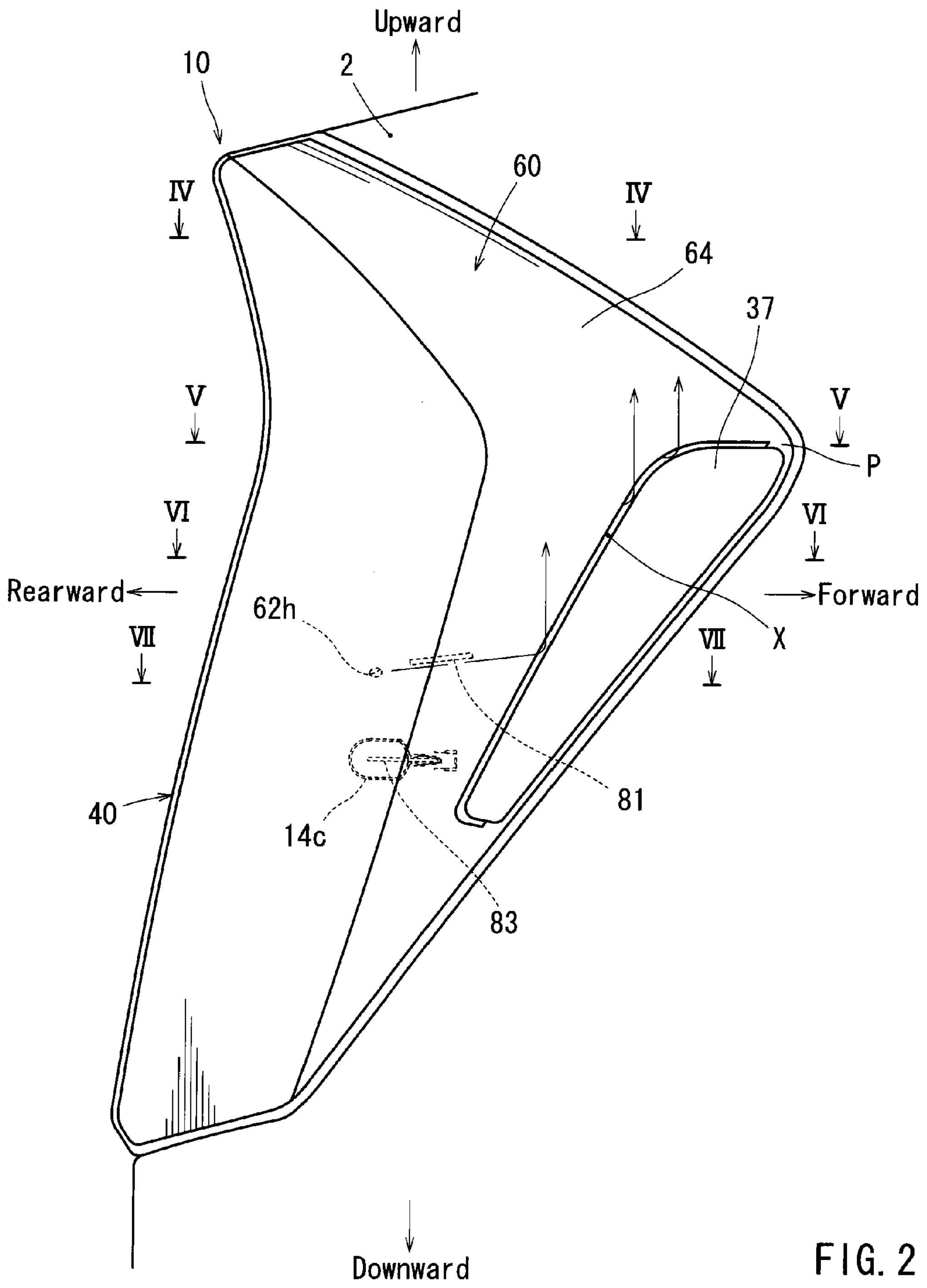
FIG. 2 is a side view of the lamp unit.

As shown in FIG. 1, the lamp unit 10 has a vertically elongated substantially flattened fan-shape in a rear elevational view. Further, as shown in FIG. 2, the lamp unit 10 has an arrowhead-shape in a right side view. Further, as shown in FIGS. 4 to 7, the lamp unit 10 has a substantially L-shape in a transverse sectional view. The right lamp unit 10 is attached to a body 2 while covering a rear right corner portion 2*k* of the body 2. Conversely, the left lamp unit 10 (not shown) is ached to the body 2 while covering a rear left corner portion (not shown) of the body 2.

Figure 4:
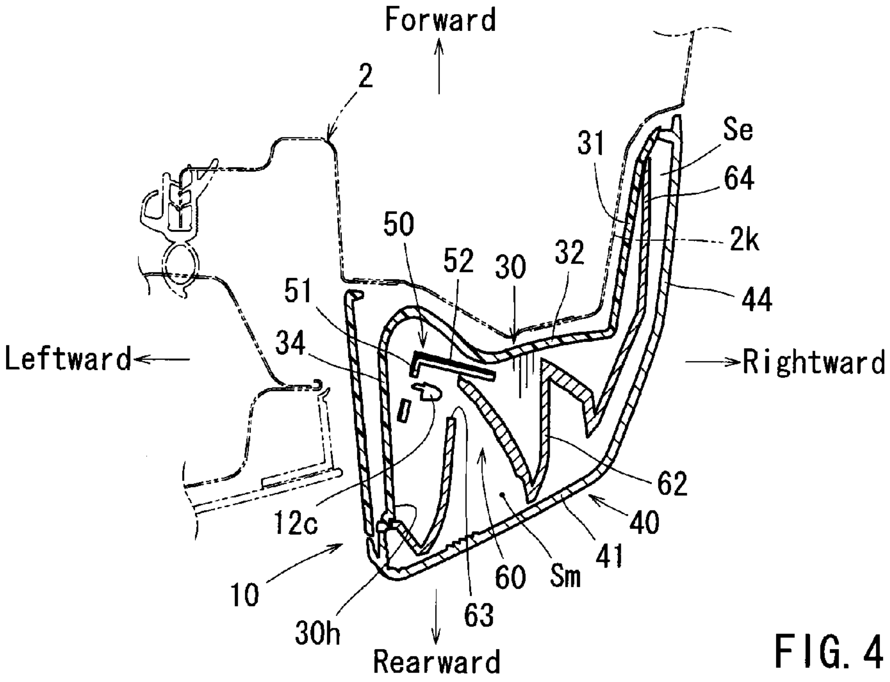
FIG. 4 is a cross-sectional view taken along line IV-IV in FIG. 1 or FIG. 2.
Figure 5:
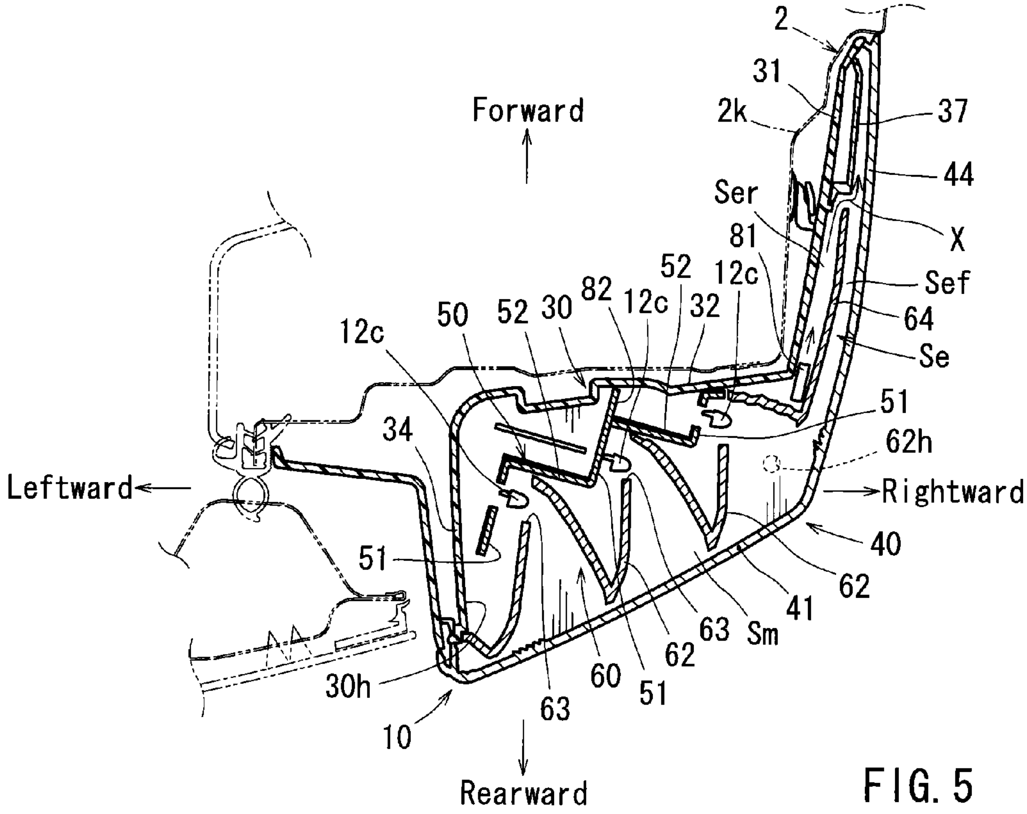
FIG. 5 is a cross-sectional view taken along line V-V in FIG. 1 or FIG. 2.
Figure 6:
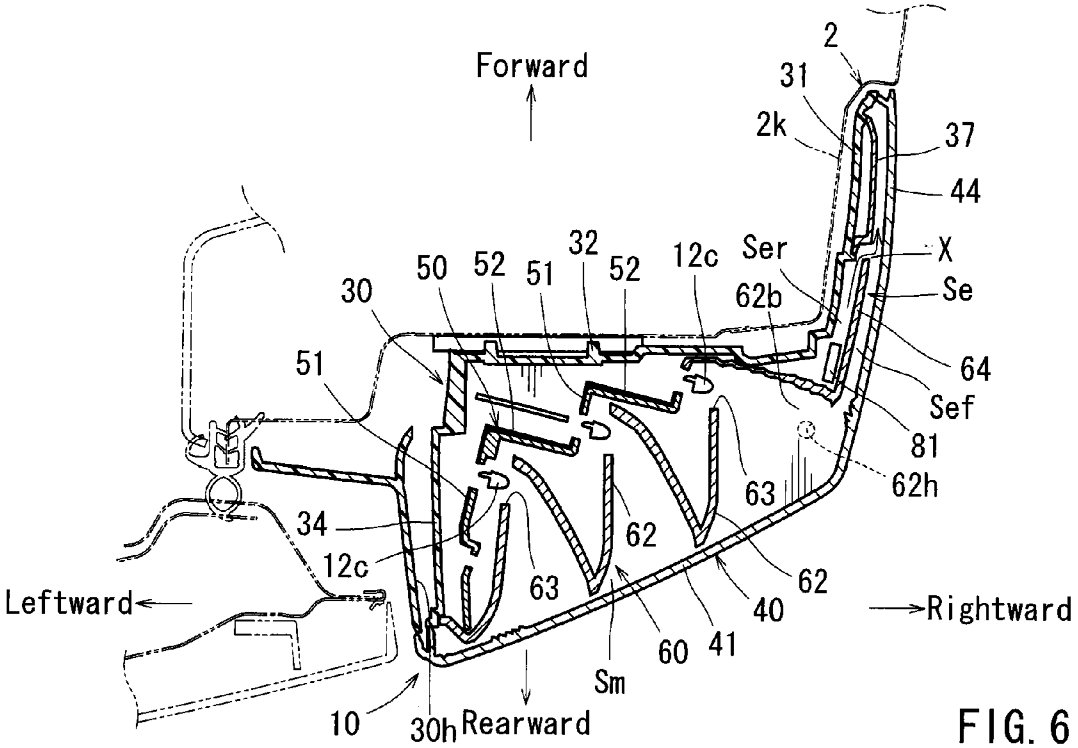
FIG. 6 is a cross-sectional view taken along line VI-VI in FIG. 1 or FIG. 2.
Figure 7:
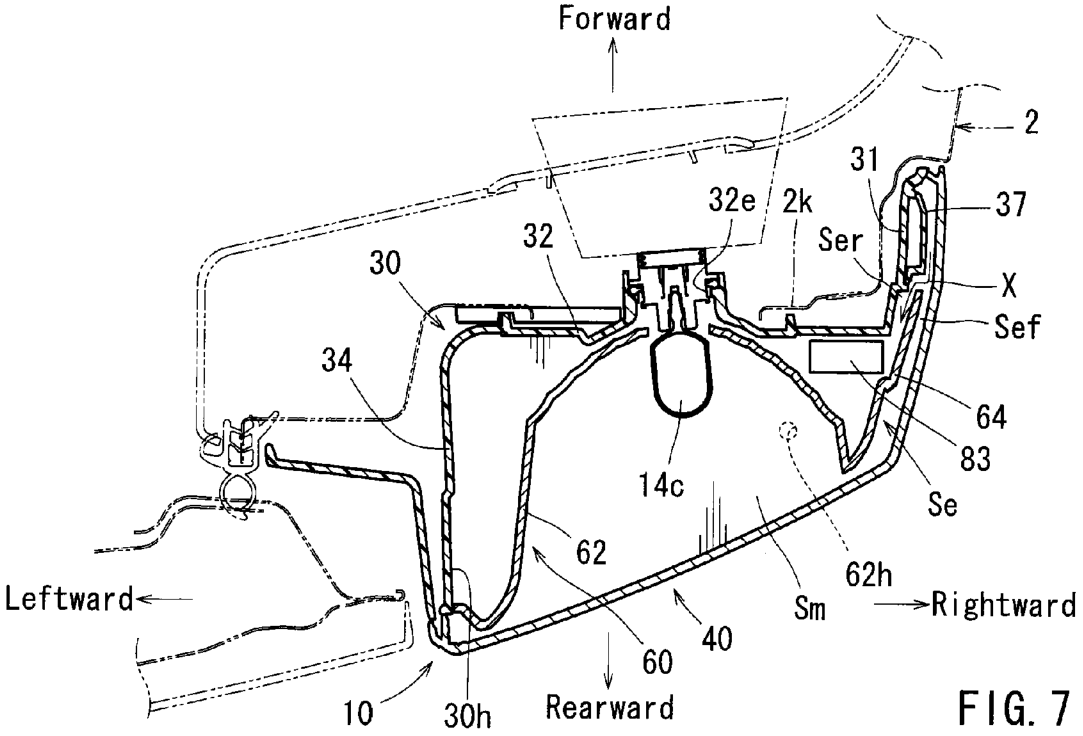
FIG. 7 is a cross-sectional view taken along line VII-VII in FIG. 1 or FIG. 2.

Further, FIG. 4 is a cross-sectional view taken along line IV-IV in FIG. 1 or FIG. 2. FIG. 5 is a cross-sectional view taken along line V-V in FIG. 1 or FIG. 2. FIG. 6 is a cross-sectional view taken along line VI-VI in FIG. 1 or FIG. 2. FIG. 7 is a cross-sectional view taken along line VII-VII in FIG. 1 or FIG. 2.

As shown in, for example, FIG. 5, the lamp unit 10 is composed of a lamp housing 30 (which will be hereinafter referred to as housing 30) that receives light sources 12*c*, a reflector 60 (which will be hereinafter described) and other components therein, and a transparent lamp lens 40 that closes a surface side opening 30*h* of the housing 30, and is formed as a hermetically-closed container-like member. The housing 30 is constructed of a right plate portion 31 that covers a right side surface of the rear right corner portion 2*k* of the body 2, a rear plate portion 32 that covers a rear side surface of the rear right corner portion 2*k*, and a left plate portion 34 that extends rearwardly from a left end portion of the rear plate portion 32, and has a substantially transversely-situated Z-shape in plan. Further, the lamp lens 40 that closes the opening 30*h* of the housing 30 is constructed of a rear surface plate portion 41 and a side surface plate portion 44, and has a substantially spread L-shape in plan (a spread V-shape in plan).

That is, the lamp unit 10 has a main space portion Sm that is defined therein by the left plate portion 34 and the rear plate portions 32 of the housing 30 and the rear surface plate portion 41 of the lamp lens 40. Also, the lamp unit 10 has a right space portion Se that is defined therein by the right plate portion 31 of the housing 30 and the side surface plate portion 44 of the lamp lens 40.

The main space portion Sm and the right space portion Se correspond to a hermetically-closed space of the present invention.

Figure 3:
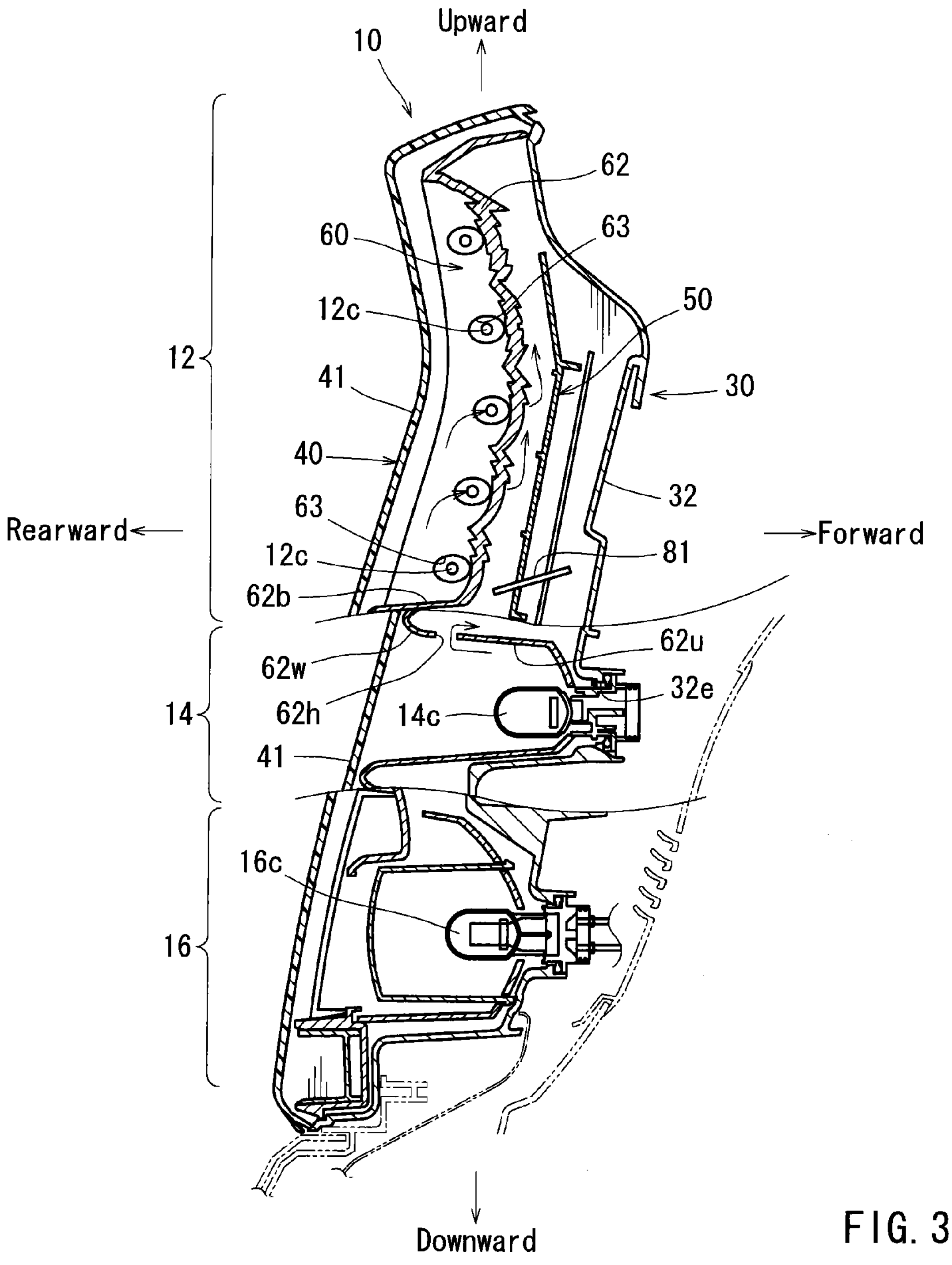
FIG. 3 is a cross-sectional view taken along line III-III in FIG. 1.

As shown in FIGS. 1 and 3, the lamp unit 10 includes a brake lamp section 12 that is positioned above its central portion, a blinker lamp section 14 that is positioned around the central portion, and a reverse lamp section 16 that is positioned below the central portion. Further, FIG. 3 is a cross-sectional view taken along line III-III in FIG. 1.

The brake lamp section 12 is a section that functions as a brake lamp and a tail lamp, and includes, for example, light sources 12*c* of LEDs. As shown in, for example, FIG. 1, the light sources 12*c* are composed of five, four and three light sources that are respectively positioned on a left side, a central portion and a right side of the brake lamp section 12. The light sources 12*c* of each group are positioned in tandem at equal intervals.

The blinker lamp section 14 is a section that includes a turn-signal lamp bulb 14*c*. The lamp bulb 14*c* is disposed in a widthwise central portion of the blinker lamp section 14. The turn-signal lamp bulb 14*c* can be used as a heat source for heating air in the lamp unit 10, which will be hereinafter described.

The reverse lamp section 16 is a section that includes a lamp bulb 16*c* that is turned on when the passenger vehicle is driven in reverse. The lamp bulb 16*c* is disposed in a position that is slightly displaced leftward from a central portion of the reverse lamp section 16.

<Regarding Structure of Brake Lamp Section 12>

As shown in FIG. 3 to FIG. 6, the brake lamp section 12 of the lamp unit 10 includes a support member 50 supporting the light sources 12*c*, and a reflector 60 that is capable of reflecting light emitted from the light sources 12*c* rearwardly of the passenger vehicle.

As shown in FIG. 4 to FIG. 6, the support member 50 is formed as a plate that is alternately folded in a substantially constant width at an angle of 90 degrees so as to have a substantially wave shape in transverse cross section. Thus, the support member 50 includes three right-pointing plate portions 51 each of which is directed rearwardly toward the right, and three left-pointing plate portions 52 each of which is directed rearwardly toward the left. The support member 50 is disposed in the main space portion Sm of the lamp unit 10 and is vertically positioned adjacent to the housing 30 like a folding screen. The light sources 12*c* are attached to the right-pointing plate portions 51 of the support member 50 in tandem at equal intervals. Further, as shown in FIG. 5, the right-pointing plate portion 51 positioned in a central portion of the support member 50 has a second guide plate 82 (which will be hereinafter described). The second guide plate 82 is attached to an upper end of the right-pointing plate portion 51 so as to extend upwardly.

The reflector 60 is disposed in the brake lamp section 12, so as to be capable of covering the support member 50 from a side corresponding to the lamp lens 40. As shown in, for example, FIG. 5, the reflector 60 is composed of a reflector body 62 that is positioned in the main space portion Sm of the lamp unit 10, and an ornamental portion 64 that is positioned in the right space portion Se of the lamp unit 10. The reflector body 62 of the reflector 60 is formed to have a folding screen shape having a substantially wave shape in transverse cross section. The reflector body 62 has openings 63 that are formed around apex portions of the wave shape. The openings 63 are respectively positioned to correspond to the light sources 12*c* such that the light emitted from the light sources 12*c* can pass therethrough (for example, FIG. 3).

The ornamental portion 64 of the reflector 60 is formed to have a flat plate shape. As shown in, for example, FIG. 5, the ornamental portion 64 is constructed to divide the right space portion Se of the lamp unit 10 into a rear side space Ser facing the housing 30 and a surface side space Sef facing the lamp lens 40. Further, a projected end portion (a right end portion in FIG. 2) of the ornamental portion 64 is positioned to surround an exposed portion 37 of the housing 30 from behind. The exposed portion 37 is disposed in a projected end portion (a right end portion in FIG. 2) of the right space portion Se of the lamp unit 10. Further, as shown in FIG. 2, a clearance X is formed between the projected end portion of the ornamental portion 64 and a rear end periphery of the exposed portion 37 of the housing 30.

<Regarding Structure of Blinker Lamp Section 14>

As shown in FIG. 7, in the blinker lamp section 14 of the lamp unit 10, the rear plate portion 32 of the housing 30 has a lump bulb attachment hole 32*e* that is formed in a widthwise central portion thereof. The turn-signal lamp bulb 14*c* is attached to the lump bulb attachment hole 32*e*. Further, the reflector body 62 of the reflector 60 is disposed in the main space portion Sm of the blinker lamp section 14 so as to cover the lamp bulb 14*c* from before of the vehicle. Further, the ornamental portion 64 of the reflector 60 is disposed in the right space portion Se.

As shown in FIG. 3 and FIG. 7, the reflector body 62 of the reflector 60 disposed in the blinker lamp section 14 is constructed to surround the lamp bulb 14*c* from before, above and below and right and left of the vehicle while the lamp bulb 14*c* is exposed rearwardly (rearwardly of the vehicle). As shown in FIG. 3, a bottom plate portion 62*b* of the reflector body 62 disposed in the brake lamp section 12 is positioned above a ceiling portion 62*u* of the reflector body 62 disposed in the blinker lamp section 14 while it is parallel to the ceiling portion 62*u*. Further, the ceiling portion 62*u* of the reflector body 62 of the blinker lamp section 14 is connected to the bottom plate portion 62*b* of the reflector body 62 of the brake lamp section 12 via a curved portion 62*w* in the proximity of the lamp lens 40.

Further, a through hole 62*h* is formed in the ceiling portion 62*u* of the reflector body 62 of the blinker lamp section 14. The through hole 62*h* is positioned adjacent to the curved portion 62*w*. Thus, the air warmed by heat of the lamp bulb 14*c* can ascend through the through hole 62*h* formed in the ceiling portion 62*u*, so as to be introduced into a rear side of the reflector 60.

Further, the lamp bulb 14*c* corresponds to a first light source of the present invention.

<Regarding First to Third Guide Plate>

As shown in FIG. 3, a first guide plate 81 is disposed in the brake lamp section 12. The first guide plate 81 is positioned in the proximity of the bottom plate portion 62*b* in a rear side of the reflector body 62 of the reflector 60. As shown in FIG. 5 and FIG. 6, the first guide plate 81 is a plate that functions to guide the air ascending along a lower surface of the bottom plate portion 62*b* of the brake lamp section 12 through the through hole 62*h* of the blinker lamp section 14 and to lead the air to the right space portion Se of the lamp unit 10. The first guide plate 81 is attached to an inner wall surface of the housing 30 while it is inclined toward the right space portion Se at a predetermined angle.

Further, as previously described, in the brake lamp section 12, the second guide plate 82 is vertically attached to the upper end of the right-pointing plate portion 51 that is positioned in the central portion of the support member 50, so as to extend upwardly (for example, FIG. 5). Thus, the air ascending along the support member 50 can be separated into right and left by the second guide plate 82.

Further, the light sources 12*c* attached to the support member 50 correspond to another light source of the present invention.

As shown in FIG. 1 and FIG. 7, a third guide plate 83 is horizontally disposed in the blinker lamp section 14. The third guide plate 83 is positioned in the rear side of the reflector body 62 of the reflector 60 in the same level as the turn-signal lamp bulb 14*c*. Thus, the air descending along an end periphery of the right space portion Se of the lamp unit 10 can be lead to a position of the lamp bulb 14*c*.

<Regarding Convection of Air>

Next, convection of air in the lamp unit 10 will be described.

Figure 8:
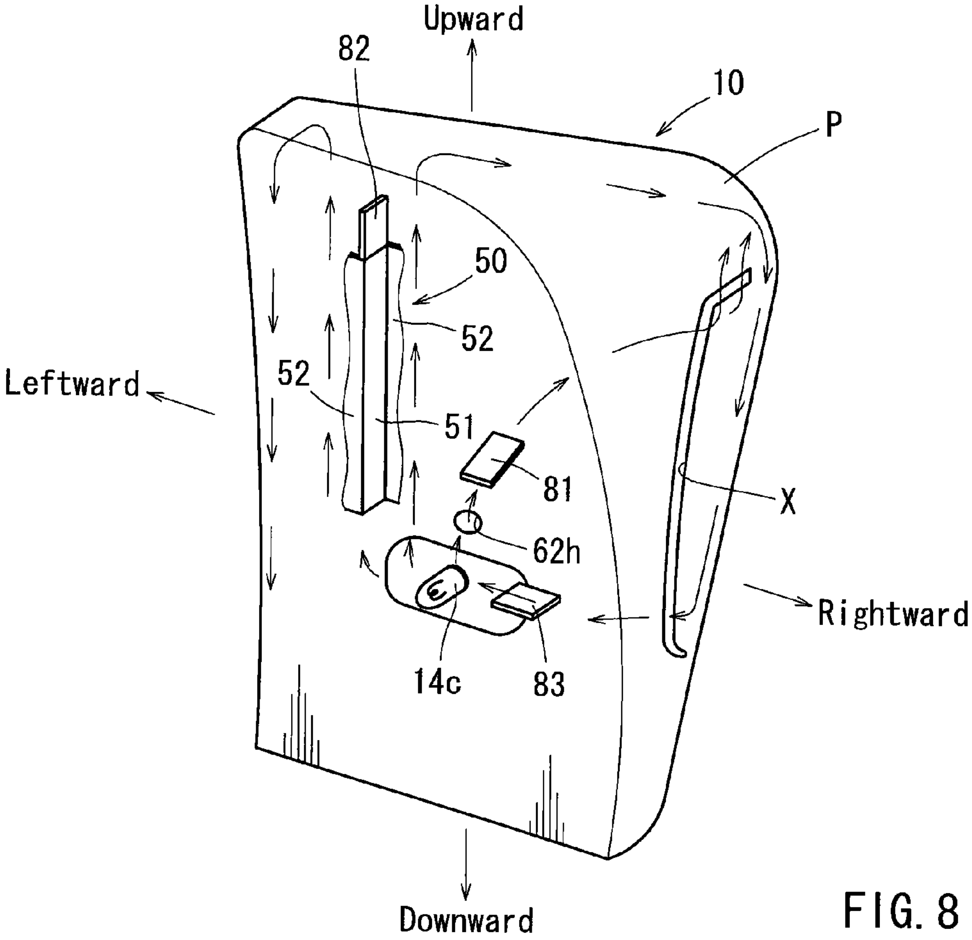
FIG. 8 is a pattern diagram of the lamp unit, which illustrates convection of air generated in the lamp unit.
Figure 9:
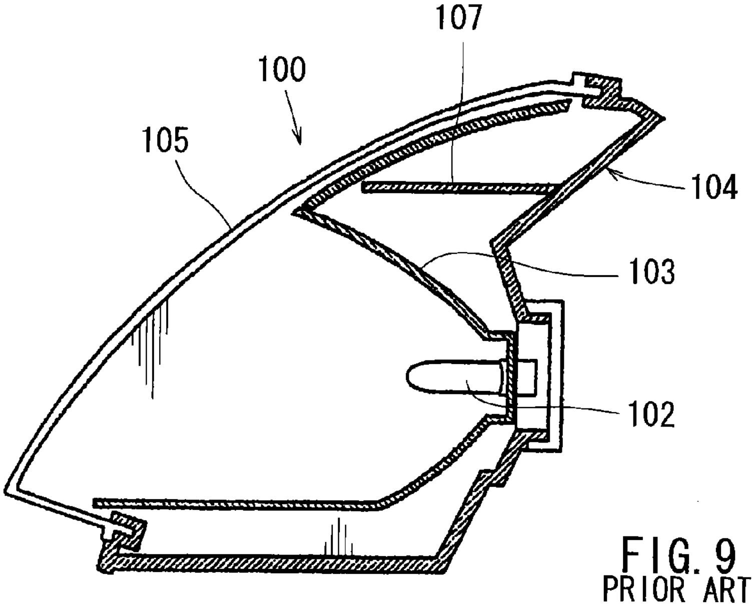
FIG. 9 PRIOR ART
FIG. 9 is a vertical cross-sectional view of a conventional lamp unit.

As shown in FIG. 3, the air warmed by the lamp bulb 14*c* of the blinker lamp section 14 and passing through the through hole 62*h* formed in the ceiling portion 62*u* of the reflector body 62 is lead to a lower side of the bottom plate portion 62*b* of the reflector body 62 disposed in the brake lamp section 12. Subsequently, as shown in FIG. 5, FIG. 6 and FIG. 8, the air flows along the lower surface of the bottom plate portion 62*b* and is lead to the right space portion Se of the lamp unit 10 by the first guide plate 81. The air introduced into the right space portion Se of the lamp unit 10 moves (shown by arrows in FIG. 5 and FIG. 6) in the rear side space Ser positioned between the ornamental portion 64 and the housing 30 while ascending along an inner surface of the ornamental portion 64 of the reflector 60. Further, as shown in FIG. 5 and FIG. 6, the air flows out via the clearance X that is formed between the projected end portion of the ornamental portion 64 of the reflector 60 and the exposed portion 37 of the housing 30, and is then lead to an outer surface of the ornamental portion 64. Thereafter, as shown by arrows in FIG. 2 and FIG. 8, the air moves to an air stagnating portion that is positioned in the end periphery of the right space portion Se of the lamp unit 10. Further, the air stagnating portion means a portion in which the air cannot smoothly flow to stagnate, which portion corresponds to an end peripheral portion of the right space portion Se of the lamp unit 10. In particular, the air tends to stagnate in a space adjacent to a tip portion P of the arrowhead-shaped lamp unit 10 shown in FIG. 2 and a circumference of the space.

Further, the first guide plate 81, the ornamental portion 64 of the reflector 60, the housing 30, the clearance X and other elements correspond to a first guide means of the present invention.

As shown in FIG. 8, the air lead to and cooled down in the air stagnating portion of the right space portion Se of the lamp unit 10 descends along the end periphery of the right space portion Se of the lamp unit 10 in an outer surface side of the exposed portion 37 of the housing 30. Subsequently, the descending air flows into the inner surface of the ornamental portion 64 via the clearance X formed between the ornamental portion 64 of the reflector 60 and the exposed portion 37 of the housing 30 at a lower position of the right space portion Se of the lamp unit 10. As shown in FIG. 7 and FIG. 8, the air entered the inner surface of the ornamental portion 64 flows through the rear side space Ser positioned between the ornamental portion 64 and the housing 30 and is lead to the position of the lamp bulb 14*c* along the third guide plate 83.

Thus, convection of air can be generated between the lamp bulb 14*c* of the blinker lamp section 14 and the air stagnating portion positioned in the right space portion Se of the lamp unit 10. Therefore, possibility of generation of fog in the air stagnating portion can be reduced.

Further, the third guide plate 83, the ornamental portion 64 of the reflector 60, the housing 30, the clearance X and other elements correspond to a third guide means of the present invention.

Further, the air warmed by the lamp bulb 14*c* of the blinker lamp section 14 and flowing along the ceiling portion 62*u* of the reflector body 62 (the air that does not pass through the through hole 62*h*) ascends through a clearance formed between the curved portion 62*w* and the lamp lens 40 and is introduced into the brake lamp section 12. As shown by arrows in FIG. 3, when the air introduced into the brake lamp section 12 ascends along a vertical wall outer surface of the reflector body 62, a portion of the air is lead to the rear side of the reflector body 62 via the openings 63 for the light sources 12*c*, and as shown in FIG. 8, ascends along the support member 50. The air reaching an upper end position of the support member 50 is separated into right and left by the second guide plate 82. That is, the air ascending on a right side of the second guide plate 82 convectively flows clockwise along an end periphery of the main space portion Sm of the lamp unit 10 and the end periphery of the right space portion Se of the lamp unit 10. Conversely, the air ascending on a left side of the second guide plate 82 convectively flows counterclockwise along the end periphery of the main space portion Sm of the lamp unit 10.

Further, the second guide plate 82 corresponds to a second guide means of the present invention.

<Regarding Advantages of Lamp Unit 10 of the Present Embodiment>

According to the lamp unit 10 of the present embodiment, the air warmed by the heat of the turn-signal lamp bulb 14*c* (the first light source) and accumulated in front of the reflector 60 is introduced into the rear side of the reflector 60 through the through hole 62*h*. Thus, even if the lamp bulb 14*c* has a small amount of heat generation, warmed air can be introduced into the rear side of the reflector 60.

Further, the warmed air introduced into the rear side of the reflector 60 is guided by the first guide plate 81 when it ascends, so as to be lead to the air stagnating portion positioned in the end periphery of the right space portion Se that is defined by the housing 30 and the lamp lens 40. As a result, flow of air can be generated in the air stagnating portion in which the air is the hardest to flow, so as to reduce possibility of generation of fog in the air stagnating portion.

That is, even if the lamp bulb 14*c* has a small amount of heat generation, it is possible to effectively use the heat of the lamp bulb 14*c*, so as to inhibit generation of fog in the air stagnating portion formed in the lamp unit.

Further, the convection of air can be generated in each of the right side and the left side of an interior of the lamp unit 10 with the aid of the support member 50 and the second guide plate 82. Therefore, the air can be efficiently fed to the end periphery of the main space portion Sm and the end periphery of the right space portion Se.

Also, the air descending along the end periphery of the right space portion Se can be lead to the lamp bulb 14*c* by the third guide plate 83. Therefore, the convection of air can be easily generated between the lamp bulb 14*c* and the air stagnating portion by the third guide plate 83.

<Modified Forms>

The present invention is not limited to the embodiment described above and the invention can be modified without departing from the scope thereof. For example, in this embodiment, the single through hole 62*h* is formed in the ceiling portion 62*u* of the reflector body 62 of the blinker lamp section 14. However, a plurality of through holes 62*h* can be formed therein.

Further, in this embodiment, each of the first guide plate 81, the second guide plate 82 and the third guide plate 83 is separately formed. However, each of the first guide plate 81, the second guide plate 82 and the third guide plate 83 can be formed in the housing 30, the reflector 60 or other such components as a portion thereof.

The invention claimed is:

1. A lamp unit constructed of light sources, a reflector that is capable of surrounding the light source and reflecting light emitted from the light source forwardly, a lamp housing that receives the light sources and the reflector therein, and a lamp lens that closes an opening of the lamp housing, wherein the reflector has a through hole that is formed in a portion positioned above a first light source as a heat source, so that air warmed by heat of the first light source can be introduced into a rear side of the reflector via the through hole, wherein the air introduced into the rear side of the reflector via the through hole and ascending therein can be led by a first guide means to an air stagnating portion positioned in an end periphery of a hermetically-closed space that is defined by the lamp housing and the lamp lens, wherein a support member supporting additional light sources is disposed in the rear side of the reflector so as to be positioned above the through hole, so that the air ascending in the hermetically-closed space can be separated into right and left by the support member and a second guide means formed in the support member, wherein the support member includes a plurality of upwardly extending plate portions, the plate portions being transverse to one another, and wherein the second guide means is positioned at an upper end of one of the plurality of plate portions of the support member, extending upwardly and away from the support member.

2. The lamp unit as defined in claim 1, wherein the air that is cooled down while the air is led to the air stagnating portion positioned in the end periphery of the hermetically-closed space and descends along the end periphery of the hermetically-closed space can be led to the first light source by a third guide means.

3. The lamp unit as defined in claim 1, wherein the lamp housing has a right plate portion, a rear plate portion and a left plate portion, wherein the lamp lens has a rear surface plate portion and a side surface plate portion, wherein the hermetically-closed space includes a main space portion that is defined by the left plate portion and the rear plate portion of the lamp housing and the rear surface plate of the lamp lens and a right space portion that is defined by the right plate portion of the lamp housing and the side surface plate portion of the lamp lens, and wherein the second guide means is disposed in the main space portion, so that the air can convect toward the right space portion.

4. A lamp unit constructed of light sources, a reflector that is capable of surrounding the light source and reflecting light emitted from the light source forwardly, a lamp housing that receives the light sources and the reflector therein, and a lamp lens that closes an opening of the lamp housing, wherein the reflector has a through hole that is formed in a portion positioned above a first light source as a heat source, so that air warmed by heat of the first light source can be introduced into a rear side of the reflector via the through hole, wherein the air introduced into the rear side of the reflector via the through hole and ascending therein can be led by a first guide plate to an air stagnating portion positioned in an end periphery of a hermetically-closed space that is defined by the lamp housing and the lamp lens, and wherein a support member supporting additional light sources is disposed in the rear side of the reflector so as to be positioned above the through hole, so that the air ascending in the hermetically-closed space can be separated into right and left by the support member and a second guide plate positioned at an upper end of the support member, wherein the support member includes a plurality of upwardly extending plate portions, the plate portions being transverse to one another.

* * * * *